United States Patent
Lee (10) Patent No.: US 11,150,676 B2
(45) Date of Patent: Oct. 19, 2021

(54) CLOTHES TREATING APPARATUS AND METHOD FOR OPERATING THE CLOTHES TREATING APPARATUS

(71) Applicant: LG ELECTRONICS INC., Seoul (KR)

(72) Inventor: Hyo Sung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 25 days.

(21) Appl. No.: 16/562,246

(22) Filed: Sep. 5, 2019

(65) Prior Publication Data
US 2020/0004278 A1 Jan. 2, 2020

(30) Foreign Application Priority Data
Jul. 4, 2019 (KR) .................. 10-2019-0080791

(51) Int. Cl.
*G05D 23/19* (2006.01)
*G05B 13/02* (2006.01)
(Continued)

(52) U.S. Cl.
CPC ......... *G05D 23/1917* (2013.01); *D06F 58/30* (2020.02); *G05B 13/026* (2013.01); (Continued)

(58) Field of Classification Search
CPC .. D06F 34/05; D06F 2103/00; D06F 2103/32; D06F 2105/28; D06F 2105/30;
(Continued)

(56) References Cited

U.S. PATENT DOCUMENTS

2010/0236296 A1* 9/2010 Choi .................. D06F 34/28
68/13 R
2017/0350067 A1* 12/2017 Choi .................. D06F 58/206
(Continued)

FOREIGN PATENT DOCUMENTS

KR 10-2016-0111685 A 9/2016

*Primary Examiner* — Kenneth M Lo
*Assistant Examiner* — Michael W Choi
(74) *Attorney, Agent, or Firm* — Birch, Stewart, Kolasch & Birch, LLP (57) ABSTRACT

A clothes treating apparatus which controls a temperature of clothes and an operating time by executing an artificial intelligence (AI) algorithm and/or a machine learning algorithm in a 5G environment connected for Internet of Things and an operating method of the clothes treating apparatus are provided. The clothes treating apparatus includes a communicator, a controller, a memory, a storage space, a temperature sensor, a temperature adjuster, and a fan. The communicator collects weather information and operation information of at least one connected device. Further, the communicator collects activity information or biometric information of the user from a portable terminal, a wearable device, or a vehicle. A user's preferred clothing temperature is derived by using clustering, deep learning, and reinforcement learning of the collected information, and the temperature of the clothes is adjusted based on the derived target temperature.

14 Claims, 9 Drawing Sheets

(51) Int. Cl.
  *D06F 58/30*   (2020.01)
  *H04W 84/04*   (2009.01)
  *H04L 29/08*   (2006.01)
  *F24F 130/10*   (2018.01)
  *D06F 58/38*   (2020.01)
  *D06F 101/00*   (2020.01)
  *D06F 103/08*   (2020.01)

(52) U.S. Cl.
  CPC ............ *G05B 13/027* (2013.01); *D06F 58/38* (2020.02); *D06F 2101/00* (2020.02); *D06F 2103/08* (2020.02); *F24F 2130/10* (2018.01); *H04L 67/10* (2013.01); *H04W 84/042* (2013.01)

(58) Field of Classification Search
  CPC .......... D06F 58/10; D06F 58/44; D06F 58/30; D06F 58/38; D06F 2101/00; D06F 2103/08; H04W 84/20; H04W 84/042; G05D 23/1904; G05D 23/1917; G05B 13/027; G05B 13/026; H04L 67/10; F24F 2130/10
  USPC ........................................................ 700/282
  See application file for complete search history.

(56) References Cited

U.S. PATENT DOCUMENTS

2018/0323996 A1* 11/2018 Roman ............... H04L 12/2818
2019/0378020 A1* 12/2019 Camilus ............... G05B 13/048
2020/0333034 A1* 10/2020 Hwang ................... G06N 3/08

* cited by examiner

- Reward = INCREASES AS DIFFERENCE BETWEEN PREDICTED TEMPERATURE AND ADDITONAL SETTING (OR PREDICTED TIME AND TAKING-OUT TIME) DECREASES

- State = CORRECTED SECOND CUSTOMIZED SETTING

- action = IMPROVED SO AS TO INCREASE REWARD

CLOTHES TREATING APPARATUS AND METHOD FOR OPERATING THE CLOTHES TREATING APPARATUS

CROSS-REFERENCE TO RELATED APPLICATION

This present application claims benefit of priority to Korean Patent Application No. 10-2019-0080791, entitled "CLOTHES TREATING APPARATUS AND METHOD FOR OPERATING THE CLOTHES TREATING APPARATUS," filed on Jul. 4, 2019, in the Korean Intellectual Property Office, the entire disclosure of which is incorporated herein by reference.

BACKGROUND

1. Technical Field

The present disclosure relates to a clothes treating apparatus and a method for operating a clothes treating apparatus. More particularly, the present disclosure relates to a clothes treating apparatus and a method for operating a clothes treating apparatus which provides clothes which are adjusted to a temperature suitable for a user's condition, by performing machine learning on data collected by weather information, Internet of Things (IoT) based home appliances, wearable devices, vehicles, and portable terminals.

2. Description of the Related Art

Generally, a clothes treating apparatus, which is an apparatus designed to wash, dry, and store clothes, is provided to store, manage, or treat the clothes.

Examples of clothes treating apparatuses include a washing machine, a dryer, a wrinkle remover, and a dust remover.

Korean Patent Application Publication No. 10-2016-0111685 (hereinafter referred to as "Related Art 1), entitled "Fabric treating apparatus and controlling method therefor", discloses a clothes treating device which dries clothes, removes dust from the clothes, and removes wrinkles of the clothes, and a control method thereof.

Related Art 1 includes a case in which clothes are held and a steam unit which supplies steam to the case. The steam unit includes an air blowing unit, a temperature sensor, a heat pump unit, and a control unit. With this configuration, hot air is circulated in the case in which the clothes are stored, and the control unit controls a temperature of the hot air. However, according to Related Art 1, the clothes treating apparatus adopts a steam unit to dry the clothes, and the hot air which is circulated by the steam unit to dry the clothes has a relatively high temperature. Therefore, when a user takes out the clothes stored in the case to wear the clothes, the clothes may be relatively hot. Accordingly, during the process of taking out the clothes from the clothes treating apparatus, when the clothes are taken out in a hot state, it is difficult for the user to immediately wear the clothes, and the user must therefore wait for a certain amount of time for the temperature of the clothes to decrease.

The above description regarding the related art is technical information that the inventor holds for the derivation of the present disclosure or learned in the process of deriving the present disclosure, and cannot thus be said to be technical information known to the public prior to the filing of the present disclosure.

SUMMARY OF THE INVENTION

The present disclosure is directed to predicting a user's preferred temperature for clothes by detecting indoor/outdoor environments, an activity state of the user, and a body condition of the user, and provides the user with clothes which are set at the user's preferred temperature.

The present disclosure is further directed to providing a user with customized clothing care, by utilizing Internet of Things connected by a 5G network to quickly collect information and utilize a broad range of data.

The present disclosure is further directed to deriving an estimated time when a user will go out, by determining the user's lifestyle pattern or behavior pattern, and determining a time period when the user is highly likely to take out the clothes, thereby providing the user with treated clothes at an appropriate time.

The present disclosure is further directed to providing a prediction algorithm for predicting a temperature of clothes or a time when the clothes will be taken out, wherein by repeatedly updating the algorithm using artificial intelligence and machine learning, the precision of the algorithm improves as the algorithm is used.

The present disclosure is further directed to predicting when a user will go out, and operating the clothes treating apparatus at the predicted time, thereby saving electrical energy.

Embodiments of the present disclosure are not limited to what has been described above. A person skilled in the art may clearly understand, from the following description, other aspects not mentioned. Further, it will be readily appreciated that the present disclosure may be realized by features and combinations thereof as disclosed in the claims.

A clothes treating apparatus according to an embodiment of the present disclosure includes a main body, a door, a circulation flow path, a communicator, and a controller, and the controller derives a user's preferred target temperature by using weather information, operation information of connected devices, activity information, and biometric information of the user. The controller adjusts a temperature of clothes in accordance with the derived target temperature.

Specifically, the main body includes a storage space in an inner space therein, in which clothes may be hung and stored.

The door is coupled to the main body to open or close the storage space.

The circulation flow path is an air flow path formed in the main body. In the circulation flow path, air is circulated through the ventilation fan. The circulation flow path includes an intake port which is connected to the storage space so that air is introduced into the storage space, an exhaust port which is connected to the storage space so as to return the air from the storage space, a first temperature sensor by which a temperature of air in the intake port is measured, a second temperature sensor by which a temperature of air in the exhaust port is measured, and a temperature adjustor which serves to heat or cool air.

In the clothes treating apparatus according to this embodiment of the present disclosure, the communicator includes a first communicator, a second communicator, and a third communicator. The first communicator accesses a server using wireless communication and collects weather information. The second communicator receives operation information of each of the connected devices. The third communicator collects activity information and biometric information of a user from a mobile device including a vehicle, a portable terminal, and a wearable device.

Further, the controller analyzes the information collected by the communicator by using deep learning to derive a target temperature.

In the clothes treating apparatus according to this embodiment of the present disclosure, information collected by the communicator is subjected to a clustering process by the controller, and is then analyzed by using deep learning.

In the clothes treating apparatus according to this embodiment of the present disclosure, the information collected by the communicator is displayed on a feature space and classified into K feature points, and is created as a dictionary formed by K words.

In the clothes treating apparatus according to this embodiment of the present disclosure, the controller performs the deep learning by inputting the information collected by the communicator into the dictionary.

In the clothes treating apparatus according to this embodiment of the present disclosure, the target temperature is derived by performing deep learning which is trained using unsupervised learning.

In the clothes treating apparatus according to this embodiment of the present disclosure, when the user changes a setting by inputting additional information, the deep learning model performs reinforcement learning by reflecting the additional information inputted by the user in a processor, and is updated so as to have a larger reward as the difference between the additional information inputted by the user and the target temperature decreases.

In the clothes treating apparatus according to this embodiment of the present disclosure, the controller includes a processor including a temperature manager which analyzes collected information to derive the target temperature and a schedule manager which analyzes the collected information to derive a predicted clothing taking-out time. Further, the controller controls the temperature adjustor and the ventilation fan such that the storage space is maintained at the target temperature at the predicted taking-out time.

In the clothes treating apparatus according to an embodiment of the present disclosure, the deep learning model performs the reinforcement learning by reflecting the difference between the predicted taking-out time and an actual clothing taking-out time in the processor, and is updated so as to have a larger reward as the difference between the predicted taking-out time and the actual taking-out time decreases.

An operating method of a clothes treating apparatus according to another embodiment of the present disclosure is a method for operating a clothes treating apparatus using information collected by an external device.

The operating method of a clothes treating apparatus includes an act of collecting weather information, operation information of connected devices, position information, movement information, and biometric information of a user.

The operating method of a clothes treating apparatus includes an act of deriving a target temperature by analyzing the weather information, the operation information of each of the connected devices, and the position information, the movement information, and the biometric information of the user using a temperature prediction algorithm, by means of a controller.

The operating method of a clothes treating apparatus includes an act of controlling a temperature of a storage space in which clothes are stored in the clothes treating apparatus to be the target temperature.

The operating method of a clothes treating apparatus includes an act of deriving a predicted taking-out time by analyzing the weather information, the operation information of each of the connected devices, and the position information, the movement information, and the biometric information of the user using a taking-out time prediction algorithm, by means of a controller.

The operating method of a clothes treating apparatus includes an act of controlling the temperature of the storage space in which clothes are stored in the clothes treating apparatus to be the target temperature at the predicted taking-out time.

The operating method of a clothes treating apparatus includes an act of performing reinforcement learning by analyzing a difference between an actual taking-out time when the user takes out the clothes and the predicted taking-out time, and updating a deep learning model for deriving a predicted taking-out time such that the difference between the actual taking-out time and the predicted taking-out time is reduced.

In the operating method of a clothes treating apparatus according to this embodiment of the present disclosure, the act of deriving a target temperature includes clustering the weather information, the operation information of each of the connected devices, and the position information, the movement information, and the biometric information of the user by means of the controller, and then performing the temperature prediction algorithm.

In the operating method of a clothes treating apparatus according to this embodiment of the present disclosure, the temperature prediction algorithm is performed by referring to a deep learning model stored in a memory by a processor.

In the operating method of a clothes treating apparatus according to this embodiment of the present disclosure, the taking-out time prediction algorithm is performed by referring to a deep learning model stored in a memory by a processor included in the controller.

In the operating method of a clothes treating apparatus according to this embodiment of the present disclosure, the act of collecting weather information includes the clothes treating apparatus and the connected devices communicating with each other using a 5G based Internet-of-Things network.

According to embodiments of the present disclosure, a temperature suitable for the user may be predicted in consideration of specific conditions such as a user's lifestyle pattern or body condition, and a temperature of the clothes may be controlled. Accordingly, clothes which are set to be customized to the user's situation may be provided to the user.

According to embodiments of the present disclosure, data may be collected by utilizing the Internet of Things connected by a 5G network. Accordingly, a large amount of data for predicting a temperature suitable for the user may be collected in a relatively short period of time.

According to embodiments of the present disclosure, the clothes may be treated and provided to a user in a time period when the user is highly likely to go out. Accordingly, the user may wear the treated clothes without separate manipulation.

According to embodiments of the present disclosure, the precision of a prediction algorithm may be improved as the prediction algorithm is used. Accordingly, a clothing care system optimized for a user may be provided.

According to embodiments of the present disclosure, the clothes treating apparatus may operate to treat the clothes at an appropriate time. Accordingly, unnecessary operation is reduced, thereby saving electrical energy.

The present disclosure is not limited to the above-described effects. A person skilled in the art may clearly understand, from the following description, other effects not mentioned herein.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. It is to be noted that the scope of the present disclosure is defined only by the claims.

The shapes, sizes, ratios, angles, the number of elements given in the drawings are merely exemplary, and thus, the present disclosure is not limited to the illustrated details. Like reference numerals designate like elements throughout the specification.

In relation to describing the present disclosure, when the detailed description of the relevant known technology is determined to unnecessarily obscure the gist of the present disclosure, the detailed description may be omitted.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms "first". "second", "third", and the like may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The term "or" is meant to be inclusive and means either, any, several, or all of the listed items.

Hereinafter, exemplary embodiments of the present disclosure will be described in more detail with reference to the accompanying drawings. Like reference numerals designate like elements throughout the specification.

Figure 1:
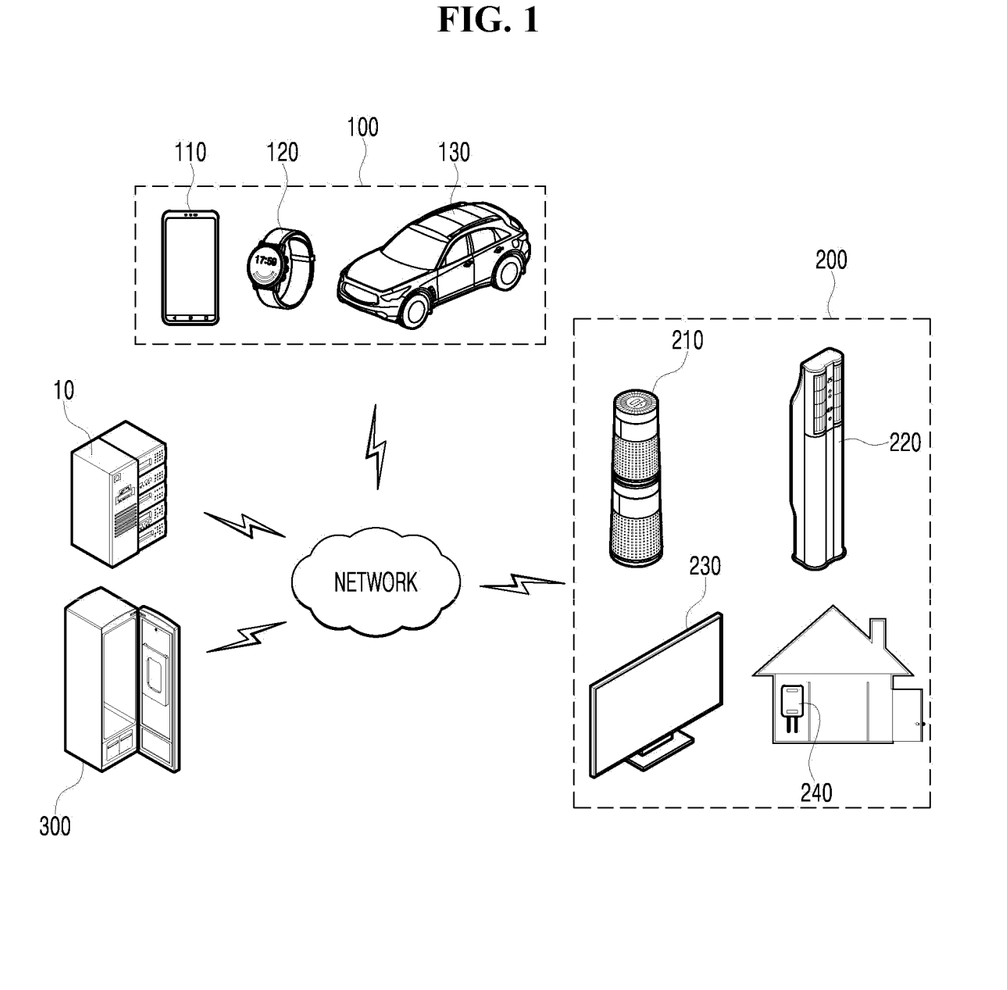
FIG. 1 is an exemplary view of a clothes treating apparatus control environment including a clothes treating apparatus, a mobile device, a home appliance, a server, and a network which connects the above components, according to an embodiment of the present disclosure.
Figure 2:
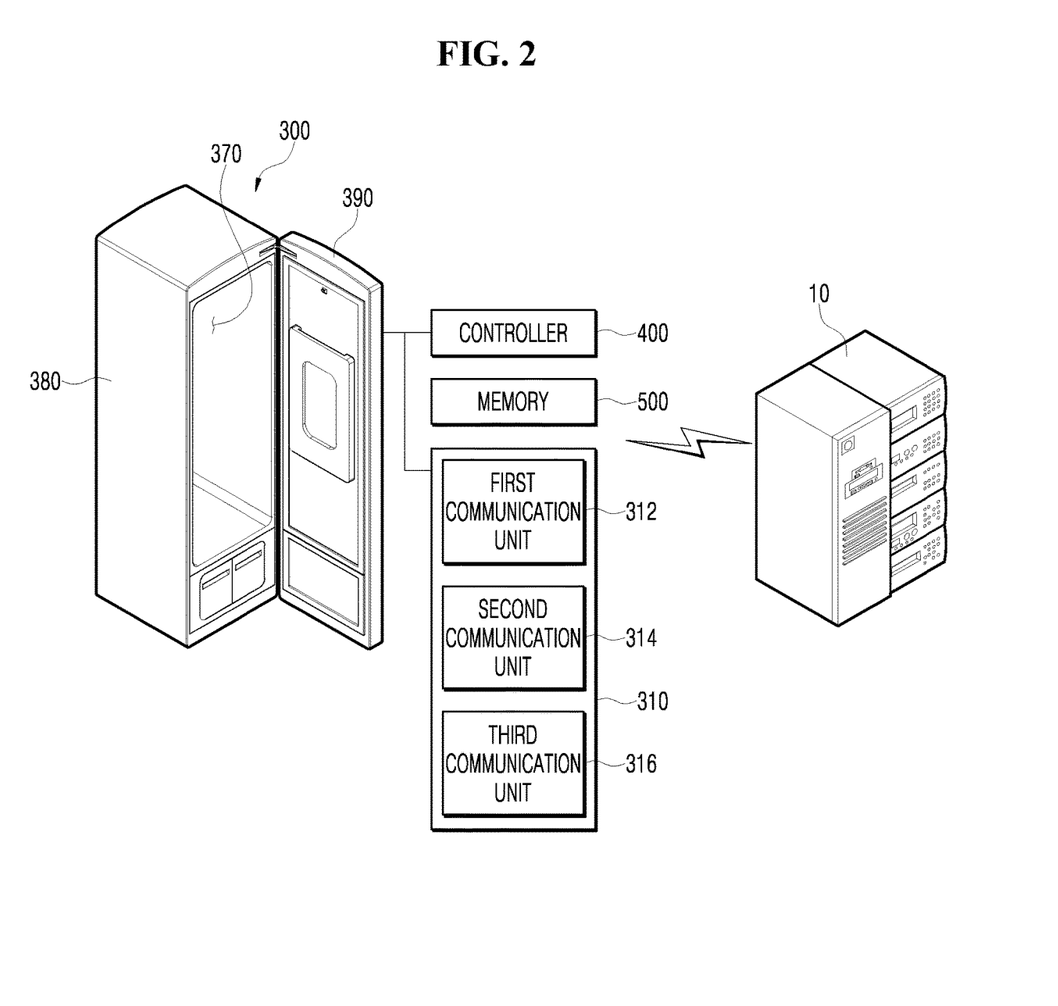
FIG. 2 is an exemplary view of a communication environment between a clothes treating apparatus and a server according to an embodiment of the present disclosure.
Figure 3:
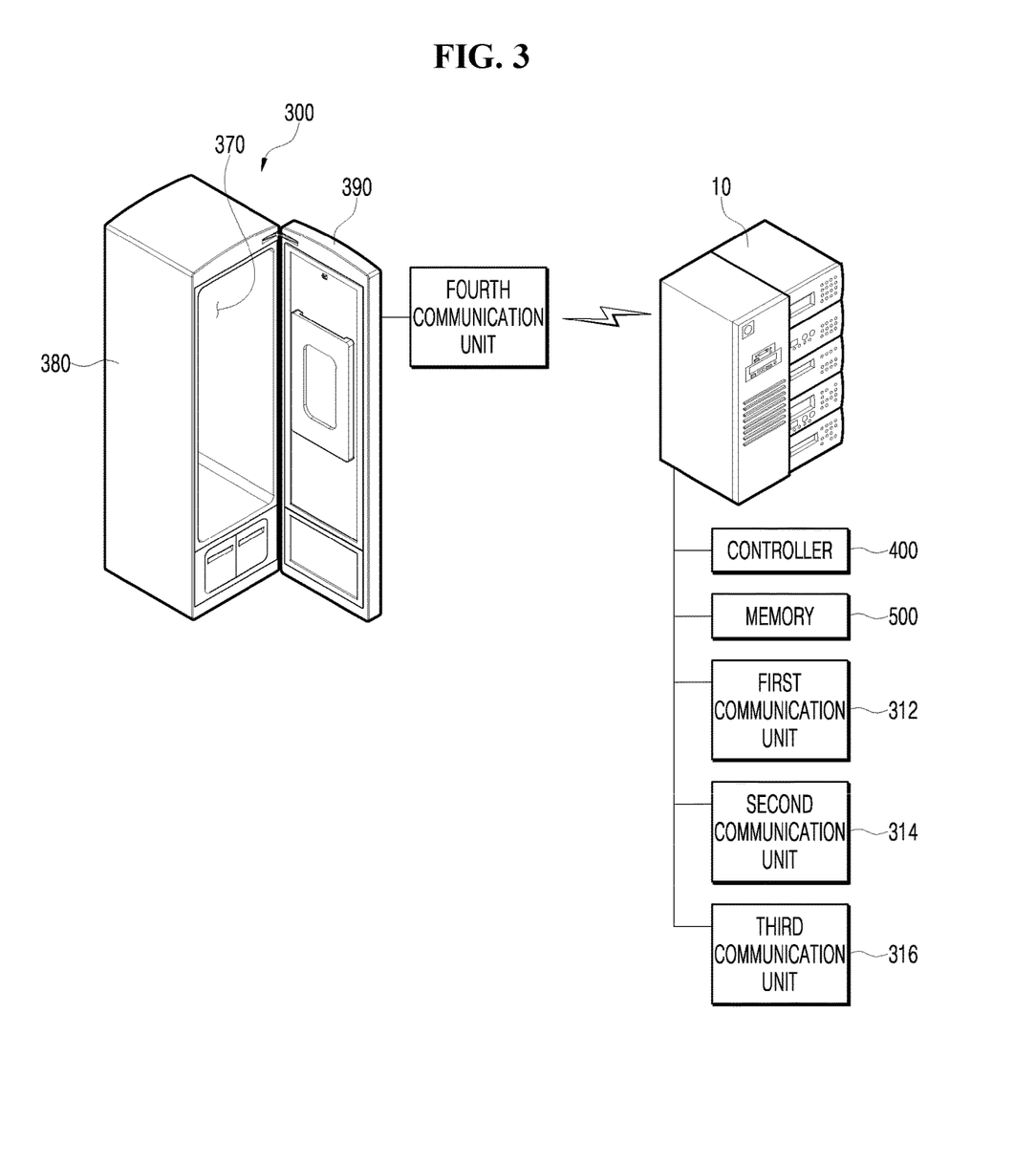
FIG. 3 is an exemplary view of a communication environment between a clothes treating apparatus and a server according to another embodiment of the present disclosure.
Figure 4:
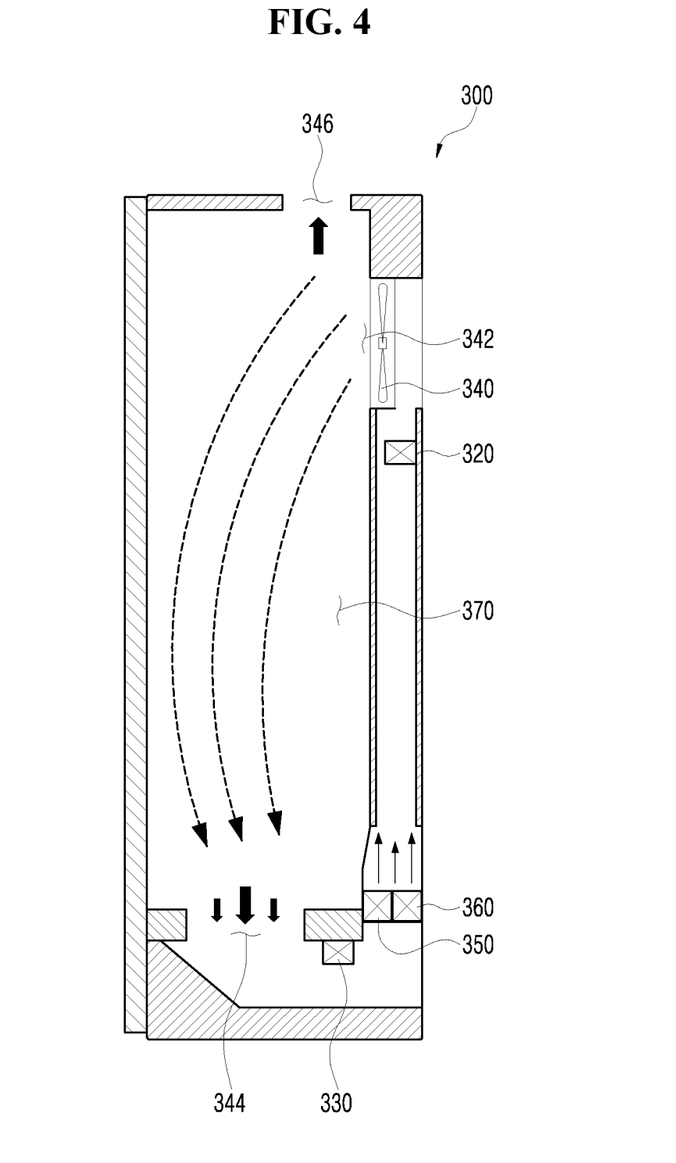
FIG. 4 is a cross-sectional view schematically illustrating a flowing path of air which is circulated in the clothes treating apparatus according to an embodiment of the present disclosure.

FIG. 1 is an exemplary view of a control environment of a clothes treating apparatus 300 including a clothes treating apparatus 300, a mobile device 100, home appliances, a server 10, and a network which connects the above components, according to an embodiment of the present disclosure. FIG. 2 is an exemplary view of a communication environment between a clothes treating apparatus 300 and a server 10 according to an embodiment of the present disclosure. FIG. 3 is an exemplary view of a communication environment between a clothes treating apparatus 300 and a server 10 according to another exemplary embodiment of the present disclosure. FIG. 4 is a cross-sectional view schematically illustrating a flowing path of air which is circulated in the clothes treating apparatus 300 according to an embodiment of the present disclosure.

As illustrated in FIGS. 1 and 3, according to the present disclosure, the control environment of the clothes treating apparatus 300 includes a clothes treating apparatus 300, mobile devices 100, connected devices 200, a server 10, and a network.

The clothes treating apparatus 300 includes a main body 380 and a door 390. A storage space 370, which is a space for storing clothes, is provided in the main body 380, and a support member on which clothes are hung to be stored may be disposed in the storage space 370.

When the door 390 coupled to the main body 380 is open or closed with respect to the main body 380, the storage space 370 is open to the outside, so that the clothes may be taken out or stored, or kept in a state separate from the outside.

As illustrated in FIG. 4, the storage space 370 may include an intake port 342, an exhaust port 344, and a ventilation port 346. The intake port 342 and the exhaust port 344 are disposed on a circulation flow path 348 through which the air is circulated into the main body 380, and the circulation flow path 348 is connected to the storage space 370 through the intake port 342 and the exhaust port 344. That is, in the main body 380, air continuously flows along the circulation flow path 348, and air which moves in one direction through the circulation flow path 348 flows into the storage space 370 through the intake port 342 and returns to the circulation flow path 348 through the exhaust port 344.

The flow of the air may be performed by a ventilation fan 340. In this case, a first temperature sensor 320 may be installed in a position adjacent to the intake port 342, and a second temperature sensor 330 may be installed in a position adjacent to the exhaust port 344.

Further, a temperature adjustor may be disposed between the first temperature sensor 320 and the second temperature sensor 330 on the circulation flow path 348. The temperature adjustor is a combination of a cooler 350 and a heater 360, and serves to heat or cool air which passes through the circulation flow path 348 in accordance with the control of the controller 400.

The storage space 370 may further include a ventilation port 346 so as to allow ventilation with the outside.

Referring back to FIG. 1, the mobile devices 100 refer to devices which are carried by the user or worn by the user, or devices which the user has boarded. In an embodiment of the present disclosure, the mobile device 100 may include a portable terminal 110, a wearable device 120, and a vehicle 130.

The clothes treating apparatus 300 receives a GPS signal from a registered portable terminal 110 to collect position changing data of the user. Further, movement information of the user may also be collected by analyzing a changing trend of the GPS of the user. Further, biometric information such as a heart rate or a body temperature of the user may be collected by the wearable device 120.

The vehicle 130 may transmit start information of the vehicle 130 or movement information of the vehicle 130 to the clothes treating apparatus 300 or the server 10.

The communication between the mobile device 100 and the clothes treating apparatus 300 and/or the server 10 may be performed through a 5G based Internet network. However, this is merely for illustrative purposes, and the content disclosed here may be implemented by various communicators depending on embodiments to which the present disclosure is applied.

According to the present disclosure, the connected devices 200 refer to Internet-of-Things based household electrical appliances equipped to communicate with the server 10.

The connected device 200 may be an air purifier 210, an air conditioner 220, a TV 230, or a boiler 240, which are provided to communicate with the server 10.

The connected devices 200 transmit operating states to the server 10, and receive operating states of other connected devices 200 from the server 10.

The information exchange or information collection between the clothes treating apparatus 300 and the portable terminal 110 and between the clothes treating apparatus 300 and the connected devices 200 may be performed by means of the server 10.

The server 10 may be a server 10 of a database 520 which provides big data required to apply various artificial intelligent algorithms and data operating the clothes treating apparatus 300.

Here, the artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

The server 10 may transmit and receive signals to and from the clothes treating apparatus 300. Specifically, the clothes treating apparatus 300 may download, from the server 10, movement information and biometric information of the user, movement information of the vehicle 130, and operation information of the connected devices 200 which are inputted from the mobile device 100 and/or the connected device 200 to the server 10.

As illustrated in FIG. 2, the above-described operation may be performed by the communicator 310.

According to an embodiment of the present disclosure, as illustrated in FIG. 2, the server 10 serves to store information collected from the mobile device 100 and the connected devices 200.

The communicator 310 may download, from the server 10, position information, movement information, and biometric information of the user, and usage information of the vehicle 130 collected by the mobile device 100, and may also download operation information of the connected devices 200 collected by the connected devices 200. Further, weather information of a region where the clothes treating apparatus 300 is installed or weather information of a region where the user is located may be downloaded.

The controller 400 analyzes the collected information through the machine learning, and controls the clothes treating apparatus 300 using the result of the analysis.

In the clothes treating apparatus 300, the control refers to adjusting of a temperature by the cooler 350 and the heater 360 of a temperature adjustor, controlling operation or an intensity of the ventilation fan 340 to induce a predetermined amount of air to flow into the storage space 370, and to maintain a temperature of the storage space 370 at a predetermined temperature.

Alternatively, various other forms of control may also be performed, such as applying vibration to or removing moisture the clothes stored in the storage space 370.

The controller 400 may include a processor 410. The processor 410 may analyze collected information by referring to a machine learning model stored in the memory 500.

According to an embodiment of the present disclosure, the machine learning model stored in the memory 500 may include a clustering model 512, a deep learning model 514, and a reinforcement learning model 516.

According to another embodiment of the present disclosure, as illustrated in FIG. 3, the controller 400 and the memory 500 may be included in the server 10.

In this case, the server 10 may include a first communicator 312 which receives weather information, a second communicator 314 which collects operation information of the connected device 200 from the connected device 200, and a third communicator 316 which collects position information, movement information, vehicle 130 usage information, and biometric information of the user from the mobile device 100.

Further, the clothes treating apparatus 300 may include a fourth communicator 318 which communicates with the server 10. The server 10 analyzes information such as the weather information collected by means of the first communicator 312, the second communicator 314, and the third communicator 316, the operation information of the connected device 200, position information, movement information, and biometric information of the user, and the usage information of the vehicle 130, by means of the controller 400. The controller 400 analyzes the collected information by referring to the machine learning model stored in the memory 500, and the clothes treating apparatus 300 may download the analyzed result through the fourth communicator 318 and thereby control the ventilation fan 340 and the cooler 350 and/or the heater 360 of the temperature adjustor.

The network serves to connect the clothes treating apparatus to the mobile device 100, the connected device 200, and the server 10.

The network may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 400 may also send and receive information using short distance communication and/or long distance communication. The short distance communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network may include connection of network elements such as hubs, bridges, routers, switches, and gateways. The network may include one or more connected networks, including a public network such as the Internet and a private network such as a secure corporate private network. For example, the network may include a multi-network environment. Access to the network may be provided via one or more wired or wireless access networks. Further, the network may support 5G communication and/or an Internet of things (IoT) network for exchanging and processing information between distributed components such as objects.

Figure 5:
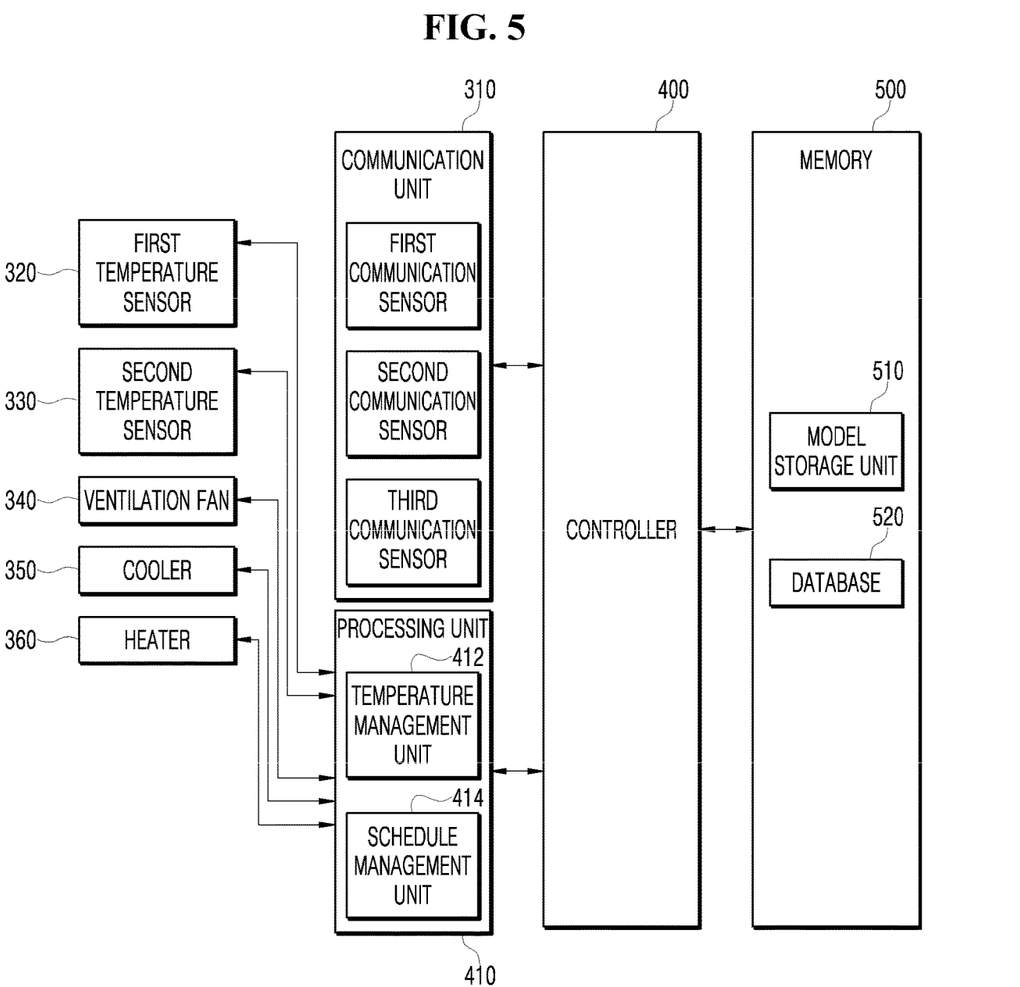
FIG. 5 is a block diagram of a clothes treating apparatus according to an embodiment of the present disclosure.

FIG. 5 is a block diagram of a clothes treating apparatus 300 according to an embodiment of the present disclosure.

As illustrated in FIG. 5, the clothes treating apparatus 300 according to this embodiment of the present disclosure includes a communicator 310, a controller 400, and a memory 500. Further, in the circulation flow path 348 connected to the storage space 370, the first temperature sensor 320, the second temperature sensor 330, the ventilation fan 340, the cooler 350, and the heater 360 may be installed.

The controller 400 may include a processor 410 which performs machine learning. The processor 410 may include a temperature manager 412 which derives a target temperature with a first data set including weather information, operation information of the connected device 200, position information and movement information, and biometric information of the user as input values, and a schedule manager 414 which derives a predicted taking-out time with a second data set which separately classifies only information for deriving the predicted taking-out time of the clothes from the first data set as input values. The memory 500 may include a model storage unit 510 in which a machine learning model is stored, and a database 520 in which collected data or a program for operation are stored.

The communicator 310 provide a communication interface required to provide signals transmitted/received between the clothes treating apparatus 300, the mobile device 100, the connected device 200, and the server 10 in the form of packet data in cooperation with the network. Further, the communicator 310 may support various kinds of object intelligence communications (such as Internet of things (IoT), Internet of everything (IoE), and Internet of small things (IoST)) and may support communications such as machine to machine (M2M) communication, vehicle to everything communication (V2X), and device to device (D2D) communication.

The processor 410 according to this embodiment may be equipped at the outside of the controller 400 as illustrated in FIG. 5 or may be equipped in the controller 400 and operate as the controller 400, or may be provided in the server 10 of FIG. 1.

The controller 400 is a type of central processor, and drives a control program installed in the memory 500 to control an overall operation of the clothes treating apparatus 300.

The controller 400 controls the ventilation fan 340, the cooler 350 and the heater 360 of the operation manipulating unit, to thereby control an amount, a speed, and a temperature of air circulated to the storage space 370 provided in the main body 380.

The controller 400 may include any types of devices which are capable of processing data, such as a processor. Here, the 'processor' may refer to a data processing device built in a hardware, which includes physically structured circuits in order to perform functions represented as a code or command present in a program. Examples of the data processing device built in a hardware include, but are not limited to, processing devices such as a microprocessor, a central processor (CPU), a processor core, a multiprocessor, an application-specific integrated circuit (ASIC), a field programmable gate array (FPGA), and the like.

According to this embodiment of the present disclosure, the controller 400 analyzes weather information and operation information of each connected device 200, collected from the connected devices 200 so as to determine a temperature of the clothes stored in the storage space 370. To this end, clustering and machine learning such as deep learning may be performed, and the memory 500 may store data used for clustering or machine learning and result data.

The clustering classifies collected information (that is, collected data) on a feature space, and extracts features of the collected data by a number and distribution of the classified classes.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is an artificial neural network structure which is formed by building up layers at each instance, and which is heavily used in natural language processing and the like and effective for processing time-series data which vary over a course of time. A DBN includes a deep learning structure formed by stacking up multiple layers of a deep learning scheme, restricted Boltzmann machines (RBM). A DBN has the number of layers formed by repeating RBM training. A CNN includes a model mimicking a human brain function, built under the assumption that when a person recognizes an object, the brain extracts the most basic features of the object and recognizes the object based on the results of complex processing in the brain.

Meanwhile, the artificial neural network can be trained by adjusting connection weights between nodes (if necessary, adjusting bias values as well) so as to produce desired output from given input. Also, the artificial neural network can continuously update the weight values through learning. Furthermore, methods such as back propagation may be used in training the artificial neural network.

An artificial neural network may be installed in the controller 400, and the controller 400 may perform learning directed to finding a user's preferred clothing temperature, based on the machine learning in which received information such as weather information, operation information of each connected device 200, and position information, movement information, and biometric information of the user are used as input data.

The controller 400 include an artificial neural network, for example, a deep neural network (DNN) and train the DNN, and examples of the DNN include CNN, RNN, DBN, and so forth. As a machine learning method for such an artificial neural network, both unsupervised learning and supervised learning may be used. The controller 400 may control to have a tone artificial neural network structure to be updated after learning.

The artificial neural network being installed in the controller 400 or the controller 400 including the artificial neural network means that the artificial neural network model is trained and calculated in the controller 400. Therefore, the deep learning utilizing an artificial neural network may be performed such that the artificial neural network model is stored in the model storage unit 510 of the memory 500, and the controller 400 refers to the stored artificial neural network model.

According to this embodiment of the present disclosure, a user's preferred clothing temperature, which may vary in accordance with an environment change, an activity of the user, or a body condition of the user, is determined, and the temperature of the clothes to be provided to the user are adjusted to match the determined temperature.

However, it is difficult to ensure a reliable result value related to the user's preferred clothing temperature in advance. Accordingly, a method which gradually approaches the user's preferred clothing temperature using unsupervised learning may be used.

The memory 500 may record various information required for the operation of the clothes treating apparatus 300, and include a volatile or non-volatile recording medium. Here, the memory 500 may include a magnetic storage medium or a flash storage medium, but the scope of the present disclosure is not limited thereto. The memory 500 may include an internal memory and/or an external memory and may include a volatile memory such as a DRAM, a SRAM or a SDRAM, and a non-volatile memory such as one time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

Figure 6:
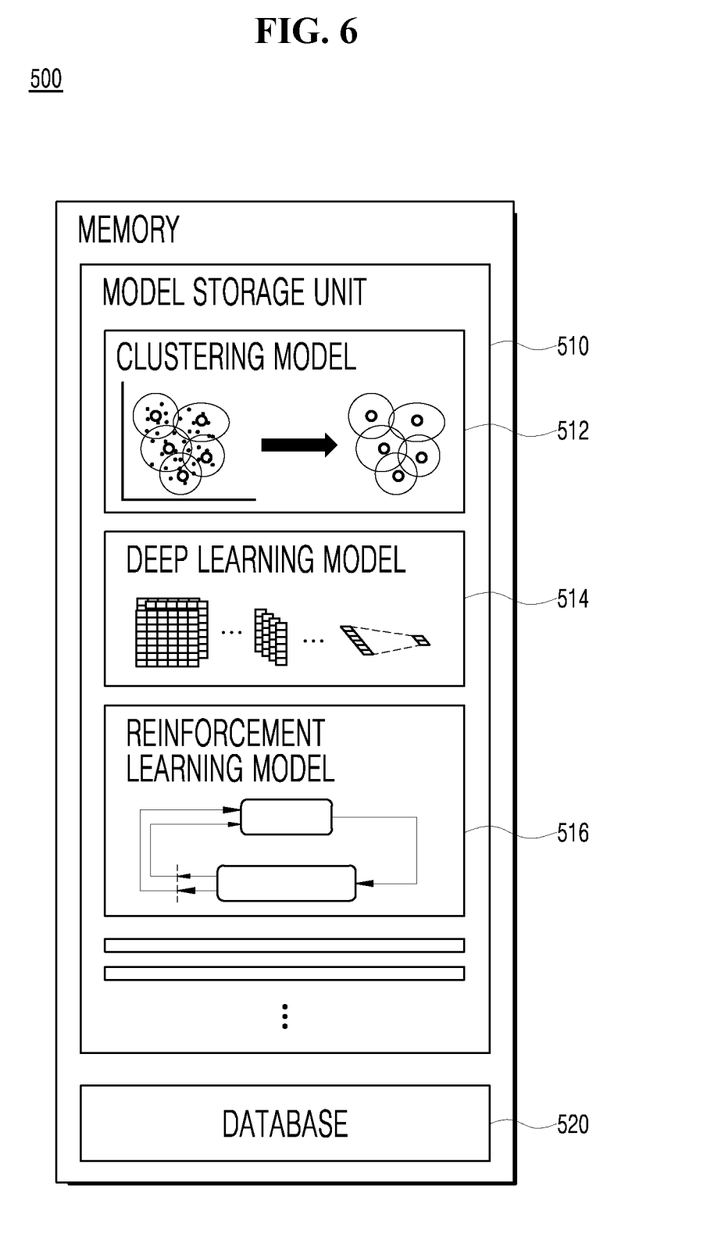
FIG. 6 is a block diagram of a memory of a clothes treating apparatus according to an embodiment of the present disclosure.

FIG. 6 is a block diagram illustrating a memory 500 of a clothes treating apparatus 300 according to an embodiment of the present disclosure.

As illustrated in FIG. 6, according to this embodiment of the present disclosure, the memory 500 includes a model storage unit 510 and a database 520.

In the model storage unit 510, a clustering model 512 for performing the clustering and a deep learning model 514 for performing deep learning may be stored.

As described above, the controller 400 and/or the processor 410 may analyze information by referring to the clustering model 512 or the deep learning model 514 stored in the memory 500.

According to this embodiment of the present disclosure, all information collected by the communicator 310 is defined as a first data set. Further, data obtained by separately extracting time-series related information from the first data set is defined as a second data set.

The controller 400 performs analysis with the first data set as an input value. Here, the analysis is subjected to the following processes. First, a process of classifying the first data set by the clustering model 512 stored in the model storage unit 510 of the memory 500 is performed. Further, after performing the clustering in the processor 410 by referring to the clustering model 512, the deep learning is performed with data values classified by the clustering. The deep learning may be performed such that the processor 410 refers to the deep learning model 514 stored in the model storage unit 510.

The first data set is analyzed by the above-described process, and a target temperature corresponding to a user's preferred clothing temperature is derived. Although the target temperature is one result of performing by the machine learning and the user's preferred clothing temperature may thus be subjective depending on the user, it is possible to gradually approach a result corresponding to an approximate value by using the reaction or the activity of the user obtained from the first data set, such as the biometric information collected from the user or information of home appliances used by the user.

Figure 7:
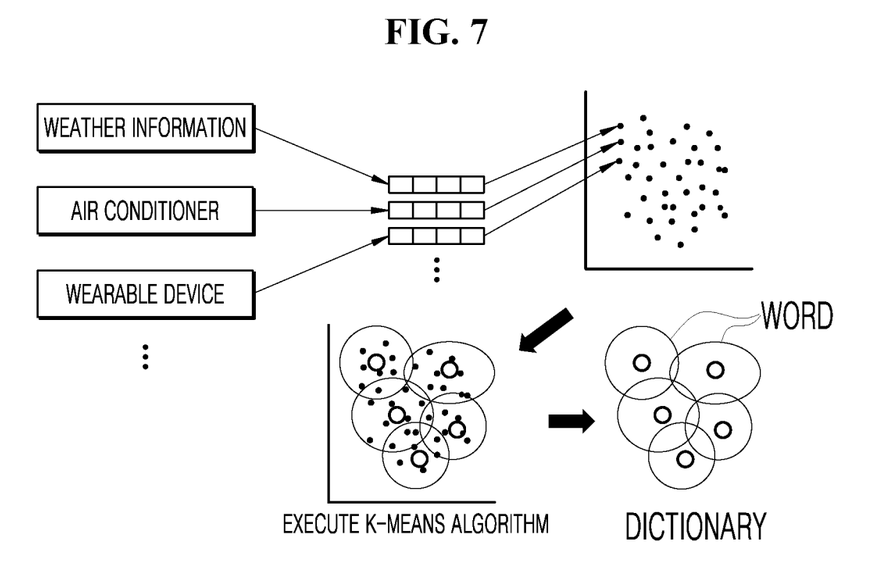
FIG. 7 is an exemplary view illustrating a process of clustering information collected by a clothes treating apparatus according to an embodiment of the present disclosure.
Figure 8:
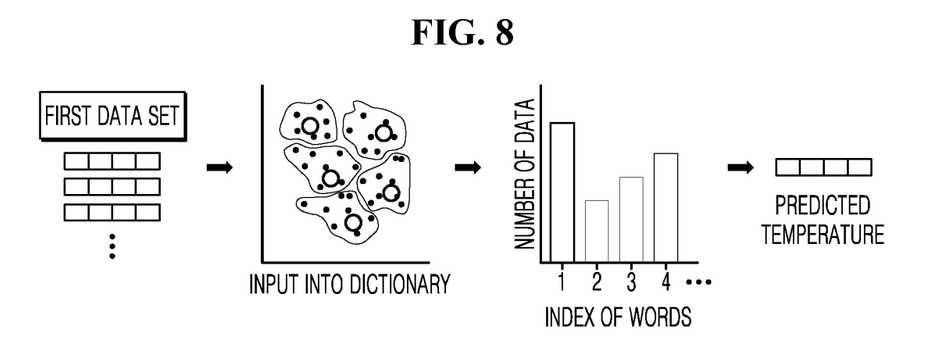
FIG. 8 is an exemplary view illustrating a process of applying a first data set to a clustering model in a clothes treating apparatus according to an embodiment of the present disclosure.

FIG. 7 is an exemplary view illustrating a process of clustering information collected by a clothes treating apparatus 300 according to an embodiment of the present disclosure, and FIG. 8 is an exemplary view illustrating a process of applying a first data set to a clustering model 512 in a clothes treating apparatus 300 according to an embodiment of the present disclosure.

According to this embodiment of the present disclosure, the clustering model 512 stored in the model storage unit 510 of the memory 500 may be a K-means clustering model. According to the K-means clustering, collected information (that is, collected data) is displayed on a feature space, and the displayed data is classified into K features to form K clusters. In this case, K is an arbitrary number, and may be substituted with a predetermined number to perform classification. The cluster of data displayed on the feature space by using the K-means clustering has K centroids. In this case, the K centroids are referred to as words, and a set of centroids formed by the gathered K centroids is referred to as a dictionary. That is, K feature points (centroids) obtained by clustering data are words, and the respective words are collected to form a dictionary. As illustrated in FIG. 8, the dictionary may be organized into a series of indexes. For example, when it is assumed that K is 3, the number X1 of data values belonging to K1, the number X2 of data values belonging to K2, and the number X3 of data values belonging to K3 are displayed and stored, and after extracting data values belonging to K1, K2, and K3 from newly inputted data, the data values are inputted to the organized index, so that features of the newly inputted data may be derived.

According to this embodiment of the present disclosure, the clustering may be considered as a process of pre-processing data before performing the deep learning. The data is classified by the features so as to increase the efficiency of the deep learning, the operating process is sub-divided so as to reduce the elapsed time in accordance with the operation, and unnecessary operations may be removed.

As a method for operating a clothes treating apparatus 300 using information collected by external devices such as the mobile devices 100, the connected devices 200, and the server 10, in a first step, weather information, operation information of each of the connected devices 200, and position information, movement information, and biometric information of the user are collected.

Then, in a second step, the controller 400 analyzes the weather information, the operation information of each of the connected devices 200, and the position information, the movement information, and the biometric information of the user using a temperature prediction algorithm so as to derive a target temperature. The temperature prediction algorithm may be a series of machine learning algorithms which predict a user's preferred clothing temperature by using the clustering and the deep learning described above.

Thereafter, in a third step, the temperature of the storage space 370 in which the clothes are stored in the clothes treating apparatus 300 is controlled to be the target temperature. The temperature of the storage space 370 may be controlled by controlling the ventilation fan 340 and the temperature adjustor using the controller 400.

Then, in a fourth step, the controller 400 analyzes the weather information, the operation information of each of the connected devices 200, and the position information, the movement information, and the biometric information of the user using a taking-out time prediction algorithm so as to derive a predicted taking-out time. The taking-out time prediction algorithm may be a series of machine learning algorithms which predict when a user will go out, using the clustering and the deep learning as described in the second step so as to derive a time when the clothes are highly likely to be taken out.

Thereafter, in a fifth step, a temperature of the storage space 370 of the clothes treating apparatus 300 in which the clothes are stored is controlled to be the target temperature at a predicted taking-out time.

Finally, in a sixth step, reinforcement learning is performed by analyzing a difference between an actual taking-out time when the user takes out the clothes and the predicted taking-out time, and a deep learning model 514 for deriving a predicted taking-out time is updated such that the difference between the actual taking-out time and the predicted taking-out time decreases.

Figure 9:
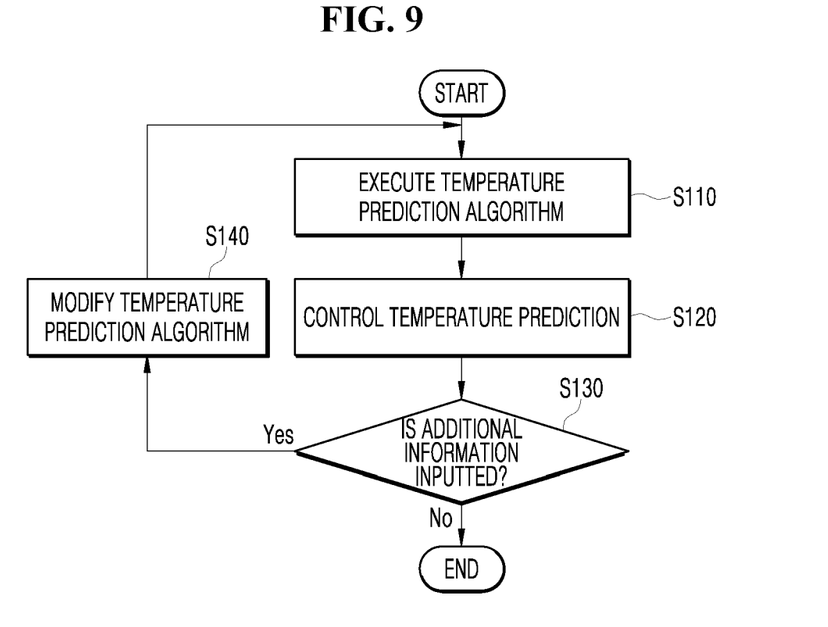
FIG. 9 is a flowchart illustrating a process of setting a target temperature of a clothes treating apparatus according to an embodiment of the present disclosure.

FIG. 9 is a flowchart illustrating a process of setting a target temperature of a clothes treating apparatus 300 according to an embodiment of the present disclosure.

The clothes treating apparatus 300 according to this embodiment of the present disclosure may derive the target temperature by using the operating method as illustrated in FIG. 9, and modify the derived target temperature.

The operating method of the clothes treating apparatus 300 will be described in detail. First, a target temperature is derived by executing a temperature prediction algorithm (S110). Temperature prediction control is performed to control the ventilation fan 340 and the temperature adjustor so that the temperature of the storage space 370 is maintained at the derived target temperature (S120). In this case, in order to additionally adjust the temperature of the clothes, when the user inputs additional information (S130), the controller 400 modifies the temperature prediction algorithm (S140). The temperature prediction algorithm may be modified by reinforcement learning, detailed description of which will be made below.

Figure 10:
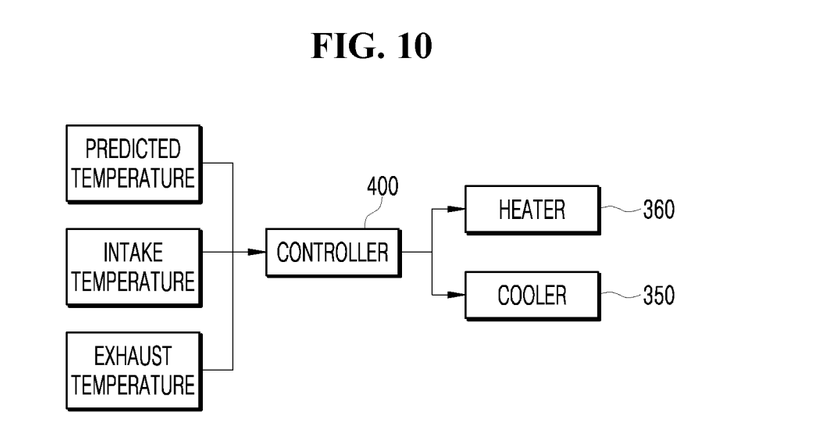
FIG. 10 is a block diagram illustrating a control process for setting a storage space of a clothes treating apparatus according to an embodiment of the present disclosure to a target temperature.

FIG. 10 is a block diagram illustrating a control process for setting a storage space 370 of a clothes treating apparatus 300 according to an embodiment of the present disclosure to a target temperature.

As illustrated in FIG. 10, a temperature of air flowing into the storage space 370 through the intake port 342 is measured by the first temperature sensor 320. Further, a temperature of air which is returned to the circulation flow path 348 from the storage space 370 through the exhaust port 344 is measured by the second temperature sensor 330. According to this embodiment of the present disclosure, the temperature adjustor is controlled so that the target temperature is equal to the temperature measured by the first temperature sensor 320. Further, as the difference of temperatures measured by the first temperature sensor 320 and the second temperature sensor 330 increases, the output of the ventilation fan 340 may be increased, so as to maintain the storage space 370 at a constant temperature. Such an operation is performed by controlling the cooler 350 and the heater 360 by means of the controller 400.

Figure 11:
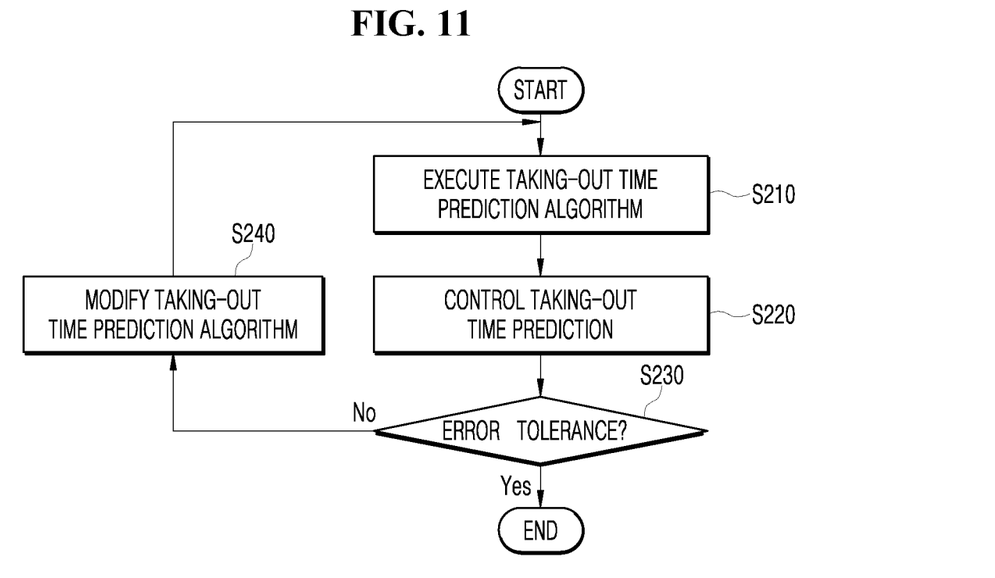
FIG. 11 is a flowchart illustrating a process of deriving a predicted taking-out time in a clothes treating apparatus according to an embodiment of the present disclosure.

FIG. 11 is a flowchart illustrating a process of deriving a predicted taking-out time in a clothes treating apparatus 300 according to an embodiment of the present disclosure.

As illustrated in FIG. 11, a predicted clothing taking-out time is analyzed using the first data set and a second data set obtained by extracting only time-series related information from the first data set as input data, and a predicted taking-out time is derived.

First, the processor 410 performs a taking-out time prediction algorithm, which classifies and analyzes the first data set or the second data set by referring to the clustering model 512 and the deep learning model 514 stored in the model storage unit 510 (S210). When the predicted taking-out time is derived through the taking-out time prediction algorithm, taking-out time prediction control is performed to cause the ventilation fan 340 and the heater 360 or the cooler 350 of the temperature adjustor to operate, in accordance with the predicted taking-out time (S220). In this case, when the clothes are not taken out at the predicted taking-out time (S230), reinforcement learning may be performed in order to reduce the difference between the actual clothing taking-out time and the predicted taking-out time. The reinforcement learning may be set such that, as the difference between the predicted taking-out time and the actual taking-out time decreases, the reward is increased. The reinforcement learning modifies the taking-out time prediction algorithm to increase the reward (S240), and this process is repeated so as to improve the precision of the taking-out time prediction algorithm.

Figure 12:
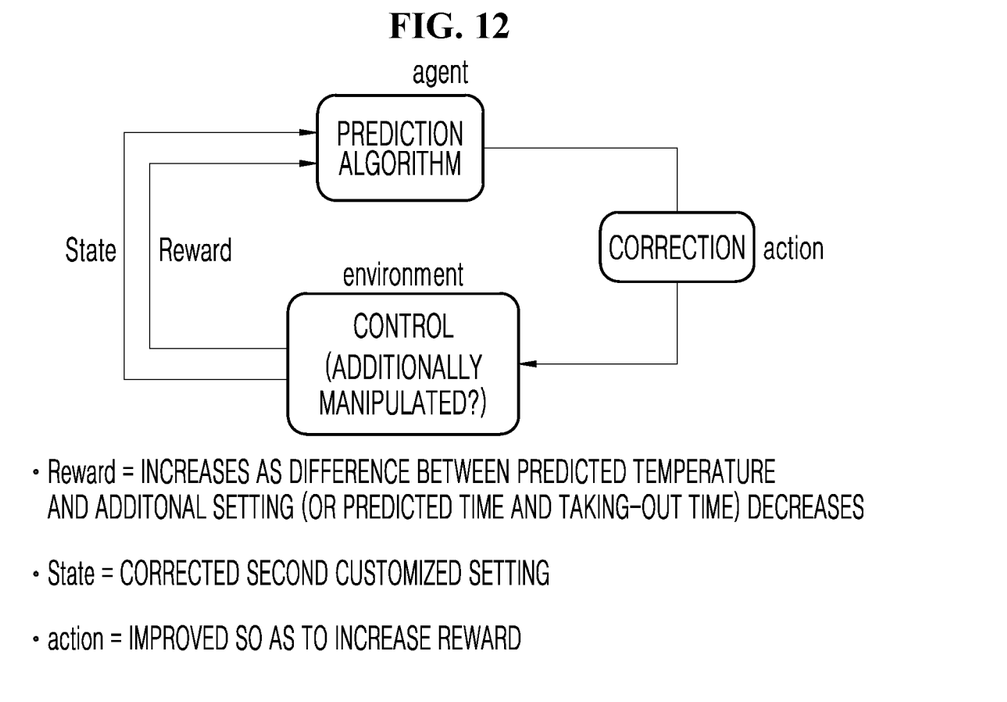
FIG. 12 is an exemplary view illustrating a reinforcement learning model performed in the clothes treating apparatus according to an embodiment of the present disclosure.

FIG. 12 is an exemplary view illustrating a reinforcement learning model 516 performed in a clothes treating apparatus 300 according to an embodiment of the present disclosure.

The reinforcement learning is a part of the machine learning. An agent which is defined in a given environment recognizes a current state, and selects an action or an order of actions which maximizes a reward, among selectable actions.

As illustrated in FIG. 12, according to this embodiment of the present disclosure, if a temperature prediction algorithm and a taking-out time prediction algorithm are referred to as prediction algorithms, the agent becomes a prediction algorithm. When a difference is detected between a prediction value which is predicted by the prediction algorithm (that is, a target temperature or a predicted taking-out time) and events which actually occur based on, for example, additional information inputted by the user and an actual clothing taking-out time, inputted during the process of operating the clothes treating apparatus 300, an action is taken to reduce the difference. The action is set such that the reward is maximized. The smaller the difference between the target temperature and a value of additionally inputted additional information, and the difference between the predicted taking-out time and the actual taking-out time, the larger the reward.

Therefore, when additional manipulation information is inputted or the actual taking-out time is inputted, the controller 400 modifies the clustering model 512 and the deep learning model 514, which are referred to by the prediction algorithm. This process is repeated, and the precision of the prediction algorithm which performs the clustering model 512 and the deep learning model 514 is improved.

The present disclosure is not limited to the example embodiments described above, and rather intended to include the following appended claims, and all modifications, equivalents, and alternatives falling within the spirit and scope of the following claims.

What is claimed is:

1. A clothes treating apparatus, comprising:
a main body including:
a storage space to store clothes;
an intake port configured to introduce air into the storage space;
an exhaust port configured to discharge the air from the storage space;
a fan configured to circulate the air in the storage space;
at least one temperature sensor located at the main body;
a temperature adjustor located between the intake port and the exhaust port, the temperature adjustor configured to perform heating or cooling;
a door coupled to the main body so as to open or close the storage space;
a first communicator configured to access a server using wireless communication to collect weather information;
a second communicator configured to receive operation information of at least one connected device;
a third communicator configured to collect at least one of position information, movement information, or biometric information of a user from a mobile device, and
a controller configured to:
analyze the weather information, the operation information of the at least one connected device, and the at least one of position information, movement information, or biometric information collected by the first to third communicators to derive a target temperature; and
control a temperature of the storage space to be the derived target temperature by controlling operations of the temperature adjustor and the fan; and
wherein the controller is configured to analyze the information collected by the first to third communicators using deep learning to derive the target temperature,
wherein the controller comprises a processor, the processor including:
a temperature manager configured to analyze the collected information to derive the target temperature; and
a schedule manager configured to analyze the collected information to derive a predicted clothing taking-out time,
wherein the controller controls the temperature adjustor and the fan such that the storage space is maintained at the target temperature at the predicted taking-out time,
wherein the deep learning is provided by a deep learning model stored in a memory, and
wherein the deep learning model is configured to perform reinforcement learning by reflecting a difference between the predicted taking-out time and an actual clothing taking-out time in the process, and the deep learning model is updated so as to have a larger reward as a difference between the predicted taking-out time and the actual taking-out time decreases.

2. The clothes treating apparatus according to claim 1, wherein the controller is configured to subject the information collected by the first to third communicators to a clustering process so as to be analyzed using the deep learning.

3. The clothes treating apparatus according to claim 2, wherein the information collected by the first to third communicators is displayed on a feature space and classified into K feature points, and is created as a dictionary formed by K words.

4. The clothes treating apparatus according to claim 3, wherein the controller is configured to perform the deep learning by inputting the information collected by the first to third communicators into the dictionary.

5. The clothes treating apparatus according to claim 1, wherein the target temperature is derived by the controller performing deep learning which is trained using unsupervised learning.

6. The clothes treating apparatus according to claim 5, wherein, when the user changes a setting of the clothes treating apparatus by inputting additional information, the deep learning model is configured to perform reinforcement learning by reflecting the additional information input by the user in the processor of the controller, and the deep learning model is updated so as to have a larger reward as a difference between the additional information input by the user and the target temperature decreases.

7. The clothes treating apparatus according to claim 1, wherein the mobile device includes at least one of a vehicle, a portable terminal, and a wearable device.

8. The clothes treating apparatus according to claim 1, wherein the at least one connected device is an air purifier, an air conditioner, a television or a boiler.

9. A method for operating a clothes treating apparatus using information collected by an external device, the method comprising:
- collecting weather information, operation information of at least one connected device, and at least one of position information, movement information, or biometric information of a user;
- deriving a target temperature by analyzing the weather information, the operation information of the at least one connected device, and the at least one of the position information, the movement information, or the biometric information of the user using a temperature prediction algorithm, by a controller;
- deriving a predicted taking-out time for taking out clothes in a storage space of the clothes treating apparatus by analyzing the weather information, the operation information of the at least one connected device, and the at least one of the position information, the movement information, or the biometric information of the user using a taking-out time prediction algorithm, by the controller;
- controlling a temperature of the storage space in which clothes are stored in the clothes treating apparatus to be the target temperature at the predicted taking-out time;
- performing reinforcement learning by analyzing a difference between an actual taking-out time when the user actually takes out the clothes and the predicted taking-out time, by the controller; and
- updating a deep learning model for deriving the predicted taking-out time such that the difference between the actual taking-out time and the predicted taking-out time is reduced.

10. The method according to claim 9, wherein deriving the target temperature includes clustering the weather information, the operation information of the at least one connected device, and the at least one of the position information, the movement information, or the biometric information of the user, by the controller, and then performing the temperature prediction algorithm.

11. The method according to claim 9, wherein the temperature prediction algorithm is performed by referring to a deep learning model stored in a memory by a processor included in the controller.

12. The method according to claim 9, wherein the taking-out time prediction algorithm is performed by referring to a deep learning model stored in a memory by a processor included in the controller.

13. The method according to claim 9, wherein the collecting weather information includes the clothes treating apparatus and the at least one connected device communicating with each other using a 5G based Internet-of-Things network.

14. A computer-readable recording medium recording a computer program to execute the method according to claim 9 using a computer.

* * * * *